United States Patent [19]

Dellinger et al.

[11] Patent Number: 4,488,008
[45] Date of Patent: Dec. 11, 1984

[54] TELEPHONE NETWORK INTERFACE DEVICE

[75] Inventors: Thomas A. Dellinger, North Richland Hills; Clifton G. Hampton, Bedford, both of Tex.

[73] Assignee: Siecor Corporation, Hickory, N.C.

[21] Appl. No.: 507,589

[22] Filed: Jun. 24, 1983

[51] Int. Cl.³ .............................................. H04M 9/00
[52] U.S. Cl. .............................. 179/81 R; 339/126 R; 179/179; 179/175.1 R
[58] Field of Search .............. 179/81 R, 175.1 R, 178, 179/175.25, 175.3 R, 98, 91 A, 179; 361/356, 422, 424; 339/125 R, 126 R

[56] References Cited

U.S. PATENT DOCUMENTS

| | | | |
|---|---|---|---|
| 4,213,013 | 7/1980 | Perna et al. | 179/98 |
| 4,303,296 | 12/1981 | Spaulding | 179/98 X |
| 4,438,477 | 3/1984 | Cawley | 179/178 X |

Primary Examiner—Gene Z. Rubinson
Assistant Examiner—James L. Dwyer
Attorney, Agent, or Firm—Roy B. Moffitt

[57] ABSTRACT

A telephone network device adapted to be used in the subscriber loop of telephone transmission system, i.e., connected to a non-telephone owned premise wiring (a household) and a telephone company owned portion of such loop at the junction where the two connect one to another. The device is a limited access device, i.e., only a portion of the device is easily accessible by non-telephone employees, and such a condition is achieved by the structure of the device which is basically an open top base containing first and second sets of terminals; a dielectric carrier and a plug both having electrical contacts therein and both adapted to be mechanically and electrically engaged and disengaged with one another; means for electrically connecting the plug to said second set of terminals and means for electrically connecting dielectric carrier to said first set of terminals; a wall means disposed between said first and second set of terminals dividing said base into first and second cavities; and, a shield means covering said first but not said second set of terminals, the first set being adapted to be connected to telephone company owned portion of subscriber loop and the second set of terminals be adapted to be connected to the subscriber owned premise wiring; the shield means acting in concert with the base to enclose the set of terminals adapted to be connected to telephone company owned portion of the subscriber loop and exposing those terminals which are adapted to be connected to the subscriber premise wiring.

13 Claims, 4 Drawing Figures

TELEPHONE NETWORK INTERFACE DEVICE

BACKGROUND OF THE INVENTION

With the advent of the deregulation of the telephone system in the United States, many conceptual changes have been required and are yet to be required in both equipment and services, not the least of which is the identity of the party responsible for repair and maintenance between subscriber and telephone company owned telephone outside equipment. A telephone subscriber, for instance, may now own his own telephones, premise wiring, PABX'S, and other associated equipment, the maintenance of which is his sole responsibility. It is in this context where the invention is most useful.

Recent rulings by the FCC require that a device be installed on the premises of each subscriber that will permit testing of the integrity of that part of the subscriber loop owned by the telephone company. The rationale behind this rule is to provide a means whereby a subscriber may avoid a telephone service charge by the telephone company arising out of a subscriber complaint regarding faulty telephone service in those instances where the faulty service is in that portion of the subscriber loop belonging to the telephone company. By use of the invention, either a subscriber and/or a telephone service person may easily unplug a previously connected jack and plug, insert another plug connected to an operating telephone and if a call can be made using such an arrangement, that portion of the subscriber loop owned by the telephone company is without fault and the fault must be in the premise wiring or equipment. Thus, a telephone subscriber may perform this testing function for himself and thus avoid a service call charge for trouble that is within that part of the subscriber loop owned by the telephone company and for which they are responsible.

The invention is a network interface device designed and adapted to be connected to the non-telephone company owned premise wiring and the telephone company owned portion of the subscriber loop at the juncture where the two connect one to the other and may be mounted inside or outside of the subject premises. If it is mounted on the outside, it is readily available to telephone company personnel as well as the subscriber. The device, mechanically and electrically, connects the premise wiring to the non-premise wiring and provides a quick disconnect means there between, namely a plug and jack. The plug is mechanically and electrically engaged to the jack thus forming an electrical circuit between the subscriber owned premise wiring equipment and the telephone owned portion of the subscriber loop. Removal of the plug from the jack disconnects the two and provides a jack into which a plug, connected to an operating telephone, may be inserted. If there is no fault in the telephone company owned subscriber loop portion, dial tone will be heard and a call may be made, thus indicating that any fault must be in the subscriber owned premises wiring and/or equipment. Absent a dial tone and a completed call, indicates the reverse, i.e., there is a fault in the telephone company owned portion of the subscriber loop.

BRIEF SUMMARY OF THE INVENTION

The herein disclosed telephone network interface device is an improvement over known like prior art telephone network devices. It contains first and second sets of terminals, the first set is adapted to be connected to a telephone system central office and a dielectric carrier having electrical contacts. The second set of electrical terminals is adapted to be connected to the telephone wiring of the subscriber premise and are connected to a plug containing electrical contacts, which are adapted to be mechanically and electrically engaged with the electrical contacts of the dielectric carrier. When the plug is mechanically and electrically engaged with the dielectric carrier—the dielectric carrier forming a portion of a jack in which the plug is mechanically engagable—an electrical circuit is completed between the premise wiring and the balance of the subscriber loop. Upon disengagement of the plug from the jack and dielectric carrier and the insertion of a plug electrically connected to an operable telephone handset, telephonic communications may be had between the handset and the central office, assuming no fault in the subscriber loop portion between the interface device and the central office. In prior art devices, both first and second set of terminals were positioned on the same side of a plate, which were set in a box flush with a wall. A lay person, customer or subscriber, had access to both sets of terminals. This arrangement created serious problems. The lay person, not knowledgeable about telephone circuitry, could blow fuses, run the risk of receiving a serious electrical charge when and if ringing voltages are supplied, or ruin the protector associated with the premise wiring that diverts electrical surges to ground, such as lightning charges. Such problems are avoided by the instant invention.

The invention employs an open-top base, containing two sets of terminals, with a shield and jack module providing a top or a covering. The shield and jack module are so arranged that one set of terminals is covered thereby (terminals for connection to telephone company owned subscriber loop) and the other set is exposed (terminals for connection to subscriber premise wiring). The shield, is secured to the base with a means (a special tool) not ordinarily in the possession of the usual subscriber; thus, making it most difficult for him to achieve access to the terminals covered by the shield and jack module.

DETAILED DESCRIPTION OF INVENTION

Figure 2:
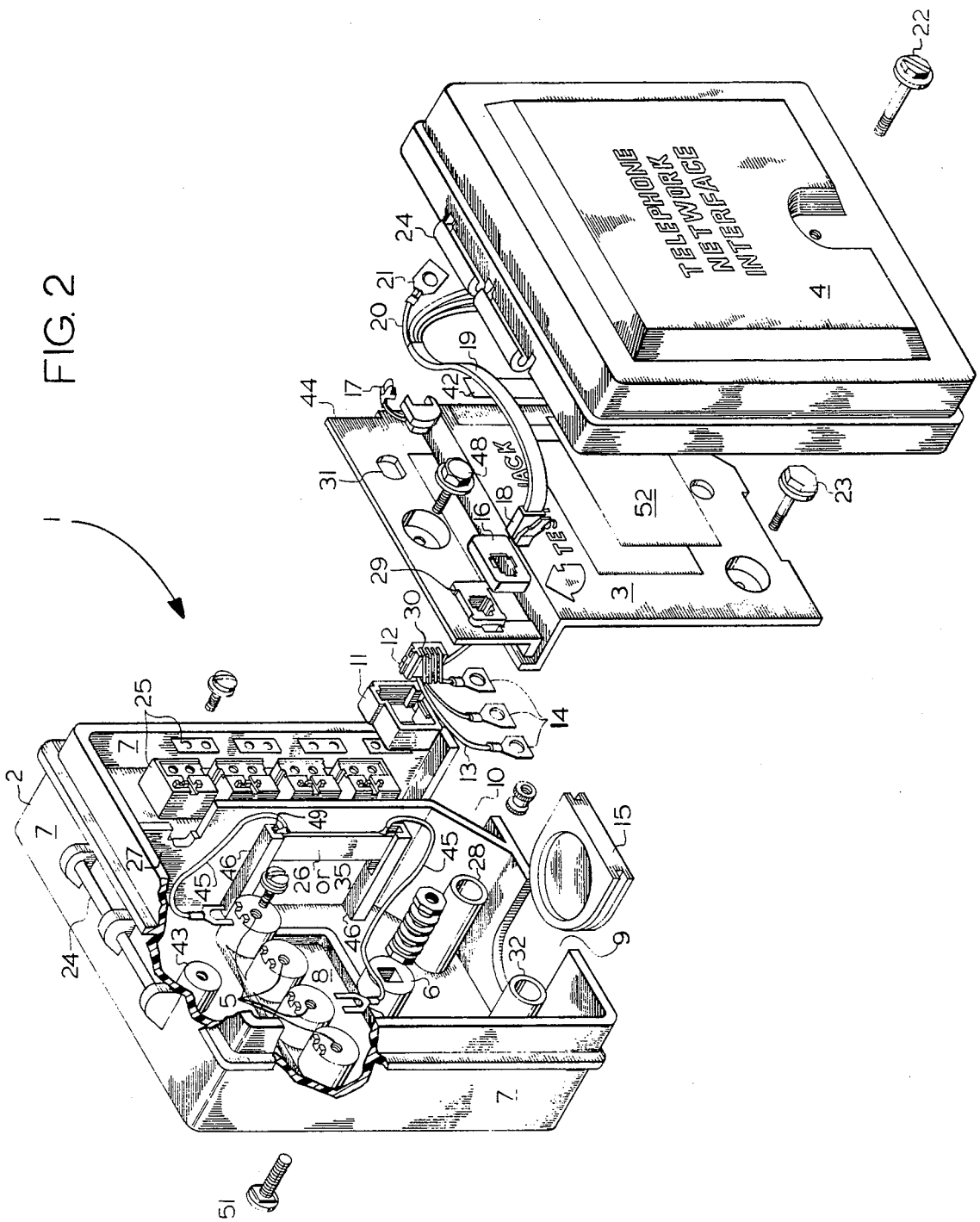
FIG. 2 is an exploded isometric and cut-a-way view of the various parts of the interface network device showing how such parts may be assembled.

Referring to FIG. 2, there is shown by element 1 a telephone network interface device of the instant invention dissembled into its component parts. Element 2 denotes a bottom portion, which in this particular embodiment is an open-top box composed of base 8 and sidewall 7, sidewall 7 circumscribing the outer periphery of base 8. Base 8 contains a plurality of upstanding terminal means 5, which may be four in number, adapted to receive or terminate wiring from the central office 38 to the subscriber's premises 37. Usually these four terminals are adapted to receive electrical conductors for ground, tip, ring and a common purpose conductor. Base 8 contains a dividing wall 27 that divides the cavity created by sidewall 7 and base 8 into two cavities. These cavities communicate with the outside through openings 9 and 10 respectively in sidewall 7. On base 8 there is disposed a grounding terminal 6 and one or more means 28, 43 and 32 adapted to receive screws 22, 23 and 48 or other like instruments to fix base 2 to shield 3, jack module 44 and cover 4. Grommet 15 is slideably engagable with terminal free edge portions of opening 9. Another grommet like that of element 15 (not shown) in like manner is adapted to be received in opening 10. One cavity of bottom portion 2 contains telephone company wiring terminals 5, grounding means 6 and fastening means 28, 43 and 32. The other cavity contains terminals 25, usually four in number (two screws each), which are adapted to be connected to and in electrical communication with terminals 5 through electrical terminal connectors 20, conductors 20, plug 18, tangs 30, electrical conductors 13 and terminal connectors 14.

Jack module 44 is adapted to partially cover the cavity containing terminals 5 and contains a plurality of openings. One such opening 29 is configurated so as to receive plug 18. For details of the plug contemplated by this invention, see U.S. Pat. No. 3,761, 869, the contents of which are incorporated herein by reference as if faithfully reproduced. Opening 29 is circumscribed by an entry gland 16, which also has an opening therein adapted to receive plug 18. Entry gland 16 is adapted to keep dust, dirt and moisture and other undesirables from coming into contact with the electrical contacts (not shown) carried by plug 18. Opening 29 is adapted to receive dielectric carrier 12 and dust cover 11 is adapted to fit around and circumscribe opening 29, which dielectric carrier 12 partially fills. This opening partially delimits a jack housing. For details of a jack housing and dielectric carrier, reference is made to U.S. Pat. No. 4,146,292 as well as U.S. Pat. No. 3,990,764, contents which are herein incorporated by reference as faithfully reproduced.

Dielectric carrier 12 has a plurality of tangs 30 adapted to be engagable with metal electrical contacts (not shown) of plug 18, in the matter shown in the prior art referred to above. Cover 11 surrounds hole 29 and dielectric carrier 12 forming a jack housing protecting dielectric 12 from undesirable elements such as water, dust, dirt, grime, grease, etc. Tangs 30 of dielectric carrier 12 are in electrical contact with insulated electrical conductors 13 having terminal electrical connector portions 14, which are adapted to be connected to terminals 5. Metal electrical contacts of plug 18 are in electrical communication with insulated electrical conductors 20 which make up cord 19. Cord 19 is inserted into hole 31 and is held in place there by bushing 17. Electrical conductors 20 are terminated by terminal means 21 and are adapted to be in electrical contact with terminals 25. Element 42 represents a color coating strip that is disposed along side terminals 25 on shield 3, displaying the usual red, black, yellow and green codes which are familiar in telephone usage. Element 52 represents a decal used for advertising or instructional purposes. Cover 4 is hingably attached to bottom portion 2 by hinge element 24 in a manner well known in the art. Shield 3 is removably attached to bottom portion 2 by screw means 23 and the hingably attached cover 4 is also fixed to bottom portion 2 in the closed position by screw 22. Screws 23 and 22 are adapted to be engaged to receptacles 32 and 28 respectively. Screw 48 is adapted to be disposed in the unnumbered hole in jack module 44 and is received in post 43 to fasten jack module 44 to base 8.

Figure 3:
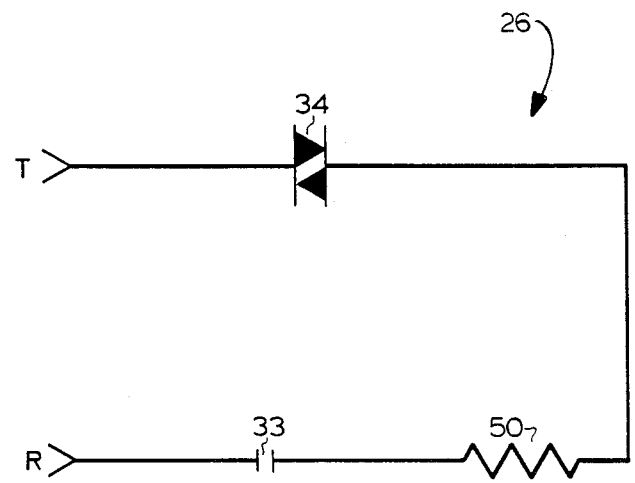
FIG. 3 is a schematic representation of a ringer means.
Figure 4:
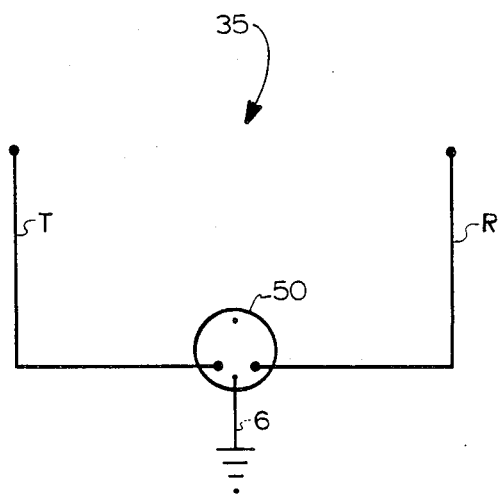
FIG. 4 is a schematic representation of a protector means.

Optional ringer means 26 (sometimes referred to as a half ringer) or protector means 35 is removably affixed to sidewall 27 by means of slots 49 in posts 46. Ringer means 26 is composed of capacitor 33, varistor 34 and resistor 50 shown in FIG. 3 and is a device useful in those circumstances where a telephone company tests its subscriber loops with a device that depends on the absence or presence of impedance in order to detect whether or not the line is in working order or not. In the event the subscriber unplugs all of his telephones or if the subscriber unplugs plug 18 and a telephone company, using the aforesaid device attempts to test the subscriber loop, the testing device will indicate no impedance and therefore a problem line absent ringer means 26. With the ringer means, such would not be the case.

Screw 23 should be only operable by a tool that is normally carried by telephone personnel and not normally found in a residence, thus making it difficult for a subscriber to remove it and achieve access to terminals 5. On the other hand, screw 22 should be one that is operable by tools commonly owned by a subscriber, so that a customer may have access to terminals 25 by merely unscrewing screw 22 and raising cover 4. By so doing, the subscriber has access to terminals 25 but not access to terminals 5.

Terminal 6 is a grounding means, adapted to be connected to protector means 35, which is basically a gas tube type protector 50 containing three leads, one lead adapted to be connected to ground through screw 51 and lead 53 and the other two leads T and R adapted to be connected to tip and ring respectively, namely tip and ring of terminal 5. The purpose of the protector means is to shunt to ground 6 through lead 21 large electrical surges that suddenly appear on the telephone line, lightning surges for example. Screw 51 can also be used to connect ground lead 21 to a ground terminal of terminals 5 absent protector means 35.

Figure 1:
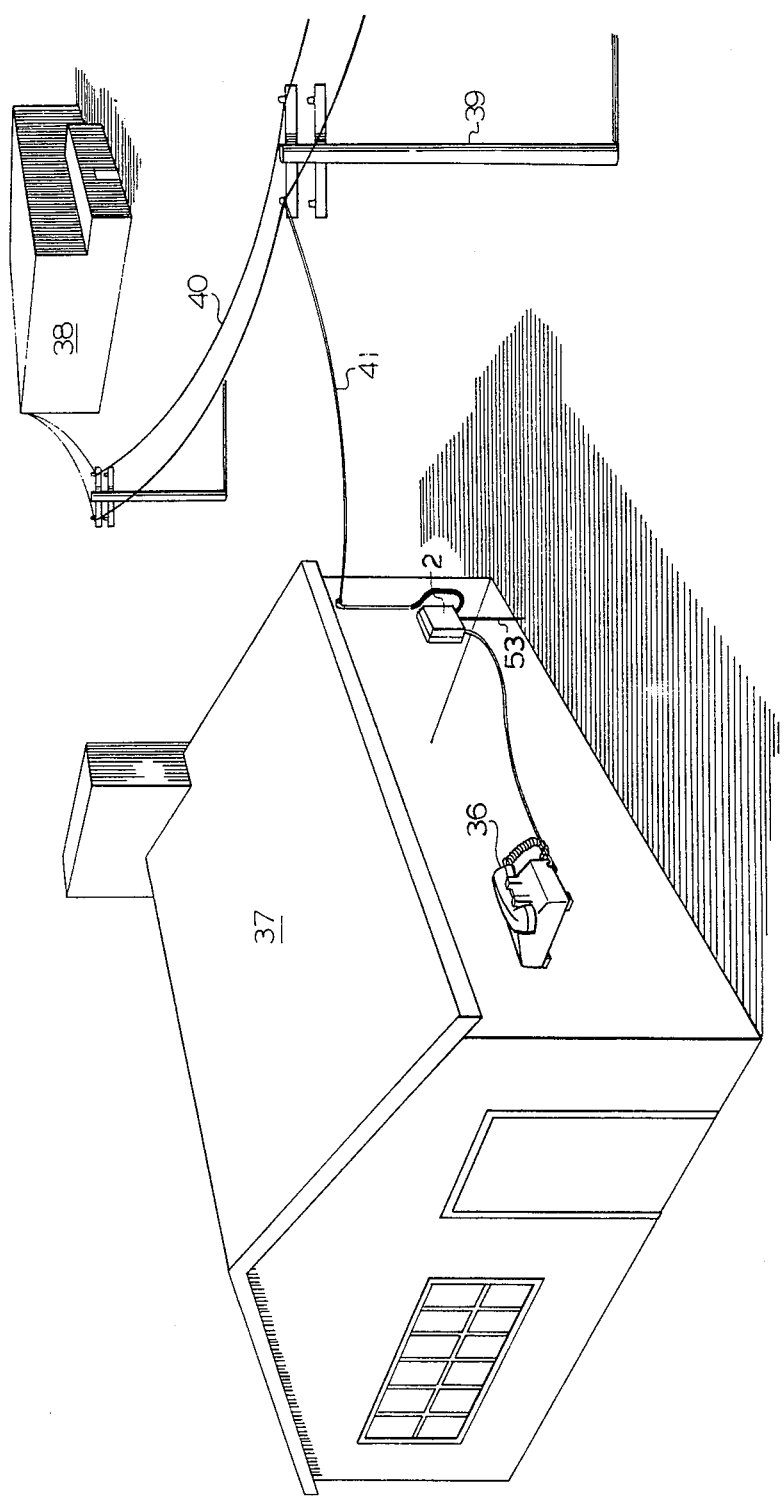
FIG. 1 is a diagramatic sketch of a subscriber's premise, and the telephone company owned subscriber loop.

FIG. 1 is a diagramatic sketch of the subscriber's premises 37 and the telephone company owned subscriber loop, i.e., that portion of the telephone circuit coming from the central office, namely, elements 38, 39 and 40 plus the telephone drop wire 41 into the subscriber premises 37. Drop wire 41 from the pole 39 to the subscriber premises terminates at the interface device 2. The subscriber only needs to engage plug 18 to dielectric carrier 12 by inserting plug 18 into the opening 29 and entry gland 16 to form a communication circuit. Assuming the subscriber suspects some form of telephone difficulty and he has an operable telephone handset, the subscriber may test the subscriber loop from the telephone network interface to the central office. He merely unscrews screw 22, rotates shield 4 in the upward direction exposing shield 3. He removes plug 18 from opening 29 and inserts therein a like plug that is connected to his operable telephone handset 36. If the telephone line from the telephone network interface to the central office is operable, the subscriber will hear a dial tone and will be able to dial out. If not, then he has ascertained that the telephone company has a fault in their part of the loop which they are required to fix it without a service charge to him. If otherwise, the suspected trouble lies within the subscriber's premise wiring.

What is claimed is:

1. A telephone network interface device adapted for limited access by telephone premise owners and complete access by telephone employees comprising an open top base, composed of a backwall and an upstanding sidewall essentially circumscribing said backwall, said open top base containing:
    (a) first and second set of terminals, said first set of terminals adapted to be connected to the telephone owned portion of a subscriber loop and said second set of terminals being adapted to be connected to the subscriber premise wiring;
    (b) dielectric carrier and plug means both having electrical contacts therein and both adapted to be mechanically and electrically engaged and disengaged with one another;
    (c) means for electrically connecting the plug means to said second set of terminals and means for electrically connecting said dielectric carrier means to said first set of terminals;
    (d) a wall means disposed between said first and second set of terminals dividing said base into first and second cavities; and,
    (e) a shield means covering said first but not said second set of terminals.

2. The interface device of claim 1 wherein said shield means contains an opening therein adapted to receive said plug means and an entry gland circumscribing said opening.

3. The interface device of claim 1 including a cover means hingably attached to said base and covering said shield means.

4. The interface device of claim 1 including a dust cover means circumscribing said dielectric carrier means.

5. The interface device of claim 1 whereby said upstanding sidewall of the open top base has two openings therein, one communicating with said first cavity and the other with said second cavity.

6. The interface device of claim 1 containing an additional terminal in the same cavity as the first set of terminals.

7. The interface device of claim 6 containing a protection means electrically connected to said additional terminal and to some of the terminals of said first set.

8. The interface device of claim 1 wherein said open top base contains a ringer means electrically connected to some of the terminals of said first set.

9. The interface device of claim 8 wherein said ringer means comprises a capacitor, a resistor and a varistor.

10. The interface device of claim 1 wherein said means for electrically connecting the plug to said second set of terminals is a set of electrical conductors and said means for electrically connecting said dielectric carrier means to said first set of terminals is a set of electrical conductors.

11. The interface device of claim 3 wherein said cover means is removably attached to said shield by a first means and the shield is removably affixed to said base by a second means, said first means being unlike said second means.

12. The interface device of claim 1 wherein said wall means disposed between said first and second set of terminals dividing said base into first and second cavities contains receiving means for receiving a ringer means.

13. The interface device of claim 12 wherein said receiving means is comprised of upstanding posts, each containing a slot therein.

* * * * *

UNITED STATES PATENT OFFICE
CERTIFICATE OF CORRECTION

Patent No. 4,488,008           Dated December 11, 1984

Inventor(s) Thomas A. Dellinger and Clifton G. Hampton

It is certified that error appears in the above-identified patent and that said Letters Patent are hereby corrected as shown below:

In the Abstract: First column, last line thereof, the word --company-- should be inserted after the word "non-telephone" and second column, fifth line, the word --company-- should be inserted before the word "employees."

Signed and Sealed this

Eighteenth Day of June 1985

[SEAL]

Attest:

DONALD J. QUIGG

Attesting Officer      Acting Commissioner of Patents and Trademarks